May 11, 1943. V. R. SHORT 2,319,162
EDUCATIONAL DEVICE
Filed July 16, 1940
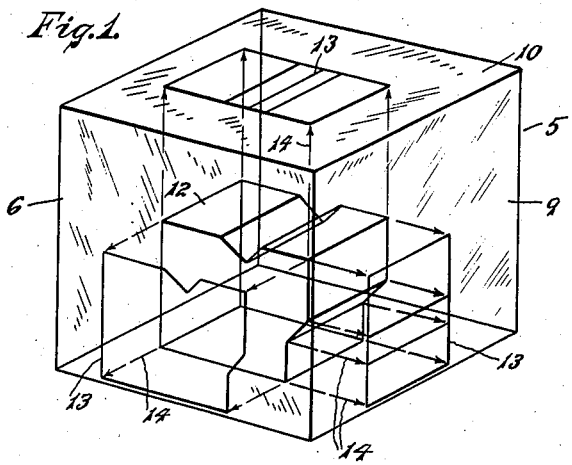
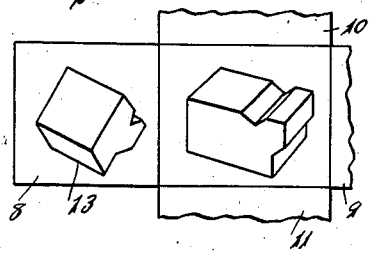
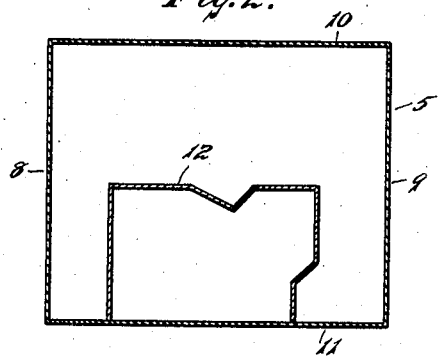
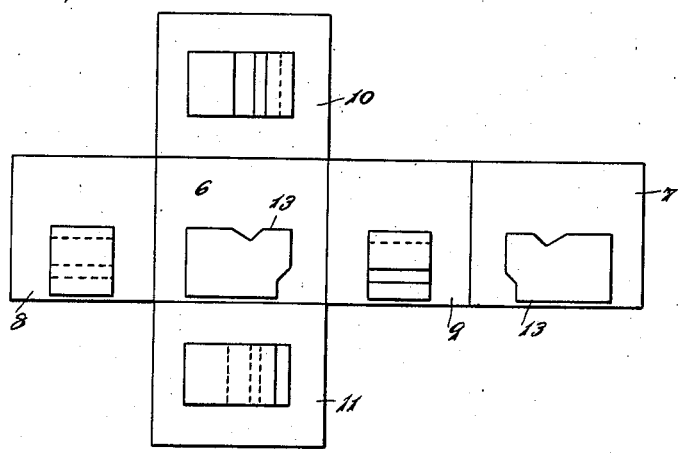
INVENTOR.
V. ROXOR SHORT.
BY
Louis V. Lucia
ATTORNEY.

Patented May 11, 1943

2,319,162

UNITED STATES PATENT OFFICE 2,319,162

EDUCATIONAL DEVICE

Vernon Roxor Short, Westbrook, Conn.

Application July 16, 1940, Serial No. 345,758

3 Claims. (Cl. 35—26)

This invention relates to educational devices and more particularly to such devices as used for aiding in the explanation of the principles involved in orthographic projection.

The primary object of the invention is to provide a device having an object which may be viewed, through different planes of projection, in a manner which will clearly illustrate the principles of multiple-view projection and so that the observer can see the so-called invisible lines to be represented in the final drawing or illustration.

A further object of this invention is to provide a device having transparent planes of projection through which an object may be viewed, either isometrically or perspectively, and on which planes are defined the lines representing the object as viewed from different directions through the said planes.

Further objects of the invention will be more clearly understood from the following description and from the accompanying drawing in which:

Fig. 1 is a perspective view of an educational device embodying my invention.

Fig. 2 is a front view of the same in central vertical section.

Fig. 3 is a plan view illustrating the different planes in unfolded position.

Fig. 4 is a fragmentary view similar to Fig. 3 but illustrating a modified form of my invention wherein the object is viewed through the different planes in perspective.

As illustrated in the drawing, the numeral 5 denotes a box-like structure having transparent walls representing front and back planes 6 and 7, end planes 8 and 9, and top and bottom planes 10 and 11.

An object 12 is contained within said structure in position to be viewed through each of said planes so as to represent a picture of the said object as viewed through each of the different planes in a direction perpendicular thereto.

It is well-known that a photographic or a pictorial drawing shows an object as it appears to the observer but that such a drawing does not describe the object fully, because it does not show the exact sizes and shapes of the several parts. In order to divide this information accurately for the benefit of a student, a number of views systematically arranged are necessary. Any rectangular object can have as many as six views because the object itself has six sides. The view which is seen from the front is called the front view; that seen from above is called the top view; that seen from below is the bottom view; and, subsequently, those seen from either end the end views.

Each side or plane, on the box-like structure 5 is constructed of a transparent material and the object 12 itself is also constructed of transparent material so that all of the defining lines thereof may be viewed through the different sides of the structure, which represent the planes of projection through which the face or faces of the object of which a view is desired, from a direction perpendicular to the surface of the said planes.

Each of the said planes preferably contains thereon a drawing, as indicated at 13, representing the projection of the real view as seen therethrough. These drawings represent all corners and edges of the object seen by the observer; all surfaces being represented by their bounding edges.

Theoretically, these views are obtained by drawing perpendiculars, called projectors, such as indicated by the arrows 14, from all points of the edges of the object to the plane of projection; the piercing points of the projectors, being infinite in number, form imaginary lines, on the transparent planes, which lines are made visual thereon by the drawings.

Since the observer is always assumed to be viewing the object through the plane of projection, a valuable feature of this invention in the teaching of multiple-view projection, is that the observer is permitted to see the so-called invisible lines which represent the final illustration of the object as viewed through the particular planes.

Devices embodying the present invention render it possible to illustrate clearly and concisely the principles involved in orthographic projection and may be applied to cylindrical or conical objects as well as to intercepting prisms. By slight rearrangement of the shape of the glass box-like structure, it is possible to provide auxiliary planes of explanation that are necessary in showing oblique-cut objects which, in mechanical practice, are referred to as auxiliary views.

By positioning the object within the transparent structure of our invention, so that it may be viewed in perspective through the different planes, it is possible to illustrate the principles of isometric drawing in 120-degree included angle full dimension representation; an isometric drawing being a drawing in which all dimensions are a true scale and wherein the object appears to be drawn in perspective but without the vanishing points.

For teaching the various principles of orthographic projection, our device may be applied to axonometric projection, oblique projection, and central projection or perspective, in addition to the multi-view drawings previously mentioned.

Perspective excels all other types of projection in representing the natural appearance of objects. It may be called "the geometry of photography," to which it is closely related in principle.

In perspective, the transparent plane is the picture plane. The lines leading from the station points to the points of the picture are visual rays or projectors. The points where the visual rays pierce the picture plane are the perspective of the respective points. Projectively, these piercing points form an accurate picture of the points as seen by the observer. By placing an object in forced perspective within the transparent box-like structure representing the different planes through which the object is viewed, and projecting the lines of the object on said planes, it is possible to illustrate to the student the change in object sizes, relationship and position, and other important factors entering into the principles of perspective; which principles may be illustrated by drawings on the different planes as shown in Fig. 4.

The development of a surface is that surface laid out on a plane. By slightly altering the shape of the box-like transparent structure involving the present invention, it is possible to show the development of a circular, rectangular, or intersecting odd-shaped prism on the surface of each plane. Further, by the use of the present invention, it is possible to show the intersection of a plane and a cylinder as well as the development of the shapes of hexagonal, rectangular, octagonal and other odd-shaped objects, at points of intersection.

From the above description and the illustration it will be clearly understood that this invention provides a simple device for rendering principles of projection, either perspective or isometric, clearly understandable and illustratable to students, which principles have been heretofore found very difficult to explain.

I claim:

1. An educational device comprising a hollow cube-shaped structure having transparent walls with the surface of each of said walls adapted to represent a plane of projection, an object mounted within said structure and visible through said walls; the surface of each of said walls having a drawing thereon representing the view of said object as seen from a position in a direction perpendicular to the plane of projection represented by each representative wall surface.

2. An educational device comprising a structure in the form of a cube, each wall of said cube being transparent and having a surface adapted to represent a plane of projection, and an object positioned within said structure and visible through said walls from different sides of said cube; each of said surfaces having a line drawing thereon of a view of said object when projected on the plane represented by the respective wall surface and as seen from positions in directions perpendicular to said surface.

3. An educational device comprising a structure in the form of a cube having transparent walls on all sides thereof with surfaces adapted to represent planes of projection, an object positioned within said structure, said object being transparent and all lines defining the same being visible through each of said walls; each of said surfaces having a representation thereon of the view of said object as seen from positions in directions perpendicular to the respective surface.

V. ROXOR SHORT.